United States Patent

Quinn et al.

Patent Number: 6,125,553
Date of Patent: Oct. 3, 2000

[54] CONTROLLER MODULE FOR CONTINUOUS FLOW TWIN AIR DRYERS AND PROCESS OF CONTROLLING SAME

[75] Inventors: Leonard Quinn, Elyria; Richard J. Conklin, III, Bay Village, both of Ohio

[73] Assignee: AlliedSignal Truth Brake Systems Company, Elyria, Ohio

[21] Appl. No.: 09/311,050

[22] Filed: May 13, 1999

[51] Int. Cl.[7] .................................................. F26B 3/00
[52] U.S. Cl. ............................................... 34/332; 34/80
[58] Field of Search ........................... 34/80, 79, 95, 34/329, 330, 332, 418, 467, 472, 473, 589

[56] References Cited

U.S. PATENT DOCUMENTS

| 5,209,764 | 5/1993 | Eberling. | |
| 5,378,266 | 1/1995 | Elamin | 96/114 |
| 5,604,991 | 2/1997 | Castle et al. | 34/80 |
| 5,961,698 | 10/1999 | Dossaji et al. | 96/130 |
| 5,983,516 | 11/1999 | Trapp et al. | 34/80 |

*Primary Examiner*—Pamela Wilson
*Assistant Examiner*—Michelle A Mattera

[57] ABSTRACT

A control module for a twin air dryer system monitors which dryer was used for drying in the previous cycle. The most recently used dryer is then the first to be regenerated. This ensures that the most recently regenerated dryer is used to dry incoming air. This occurs regardless of the drying mode, i.e., whether it is high air use or normal brake system use. The system minimizes the risk of dryer saturation and loss of function. Moreover, maintenance requirements are simplified, since the air dryer cartridges are more evenly used.

11 Claims, 3 Drawing Sheets

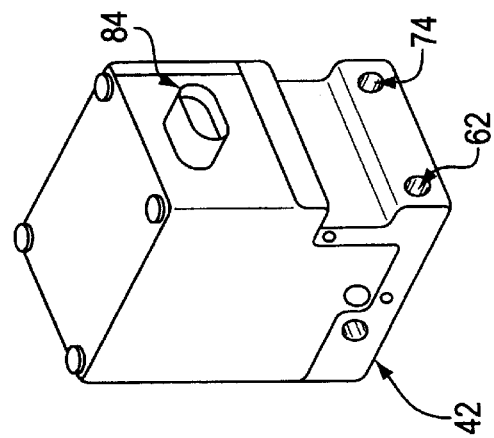
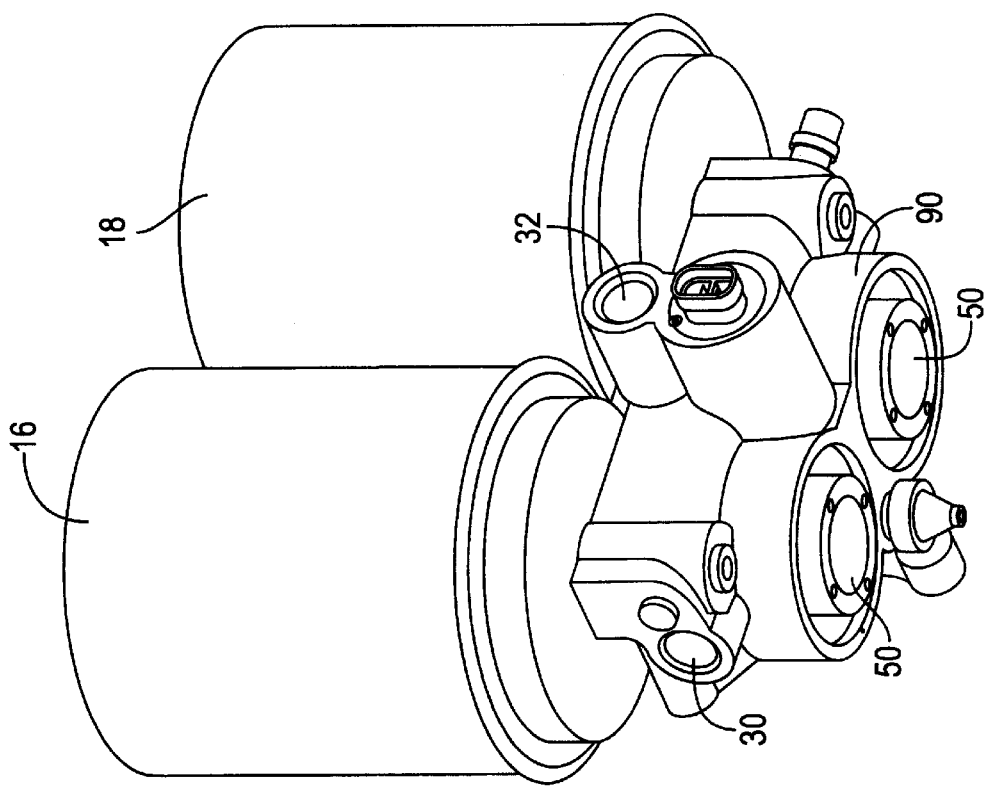

CONTROLLER MODULE FOR CONTINUOUS FLOW TWIN AIR DRYERS AND PROCESS OF CONTROLLING SAME

BACKGROUND OF THE INVENTION

This invention relates to compressed air systems for automotive vehicles, and more particularly to a system employing and method of controlling a pair of air dryers for removing moisture from compressed air.

Transit coaches and air-assisted bulk-off load units are illustrative of compressed air systems used to operate the brakes of the vehicle, as well as to operate accessories associated with the vehicles. A standard air dryer cannot meet the demands of these systems. A desiccant material in the air dryer becomes overwhelmed and saturated, ultimately resulting in loss of function.

Continuous flow air dryers are required for air brake vehicle applications where high air use requires extended charging times and high compressor duty cycles. Continuous flow systems, therefore, typically use a pair of air dryers disposed in parallel between a source of compressed air and a storage reservoir. By occasionally purging air to exhaust from an air dryer, the dryer (specifically, the dessicant material) is regenerated and is more effective in removing moisture during its next duty cycle. Accordingly, prior systems employ a switching arrangement that alternates the pair of air dryers between charging the reservoir and purging, i.e., one air dryer is regenerated while the other air dryer supplies dry air to the reservoir.

Known competitive twin dryer arrangements function so that if the cycle is interrupted, the system starts anew. However, either a default arrangement establishes that the same air dryer begins the cycle or the cycle is random and there is a fifty percent (50%) chance that the saturated air dryer will be used to initially charge the reservoir upon startup. Thus, the same air dryer is used again and again for either a standard brake system charge cycle, i.e., normal brake system air use or with high air use associated with operating special vocational functions, such as air-assisted bulk off-loading, tire inflation, etc.

The normal brake mode involves charging the system reservoir used specifically for braking. Thus, there is a fifty percent (50%) probability that the previously used (and now saturated) air dryer cartridge will be the first one used for the next charge cycle. This increases the probability that wet air is introduced into the system—an undesirable result. Moreover, since one cartridge is used more frequently than the other, periodic maintenance associated with the twin dryers encounters one cartridge requiring service, and the other cartridge still available for use. Diagnostics for separately testing the individual cartridges is not presently available without additional test equipment. Therefore, to avoid the unnecessary expense of additional test equipment, and to maximize the productivity of a maintenance schedule, it would be preferred that both air dryers be serviced at the same time.

SUMMARY OF THE INVENTION

The present invention contemplates a new controller module for continuous flow of twin air dryers that overcome the above-referenced problems and others.

The compressed air system includes an air compressor and a reservoir for storing compressed air. First and second air dryers are interposed between the compressor and the reservoir for removing moisture in the air before it is stored in the reservoir. A control module is operatively associated with the first and second air dryers for initiating an air drying or reservoir charging cycle in one of the air dryers and a purge cycle in the other air dryer, and periodically switching the drying and purging cycles between the air dryers. The control module monitors the use of the air dryers so that if the cycle is interrupted, the system initially regenerates or purges the air dryer that was last used for drying.

The control module ensures that adequate pressure exists for drying performance and that sufficient air is available to meet the vehicle air needs.

The control module also interfaces with a governor associated with the compressor.

A control process associated with the compressed air system assures that adequate drying performance is achieved by identifying the air dryer that was last used for drying and regenerates that dryer prior to regenerating the other air dryer.

A principal advantage of the invention is found in improved performance that reduces the prospect for moisture becoming entrained in the compressed air system.

Another advantage of the invention is associated with minimizing the risk of dryer saturation and subsequent loss of function.

Still another advantage of the invention is associated with a more evenly balanced use of the first and second air dryers so that maintenance is optimally performed on both cartridges at the same time.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts. A preferred embodiment and preferred process for controlling continuous flow twin air dryers are described in this specification and illustrated in the accompanying drawings. The drawings include:

FIG. 2 is a perspective view of a twin air dryer assembly;

FIG. 3 is a perspective view of a control module; and

DETAILED DESCRIPTION OF THE PREFERRED EMBODIMENT AND METHOD

Figure 1:
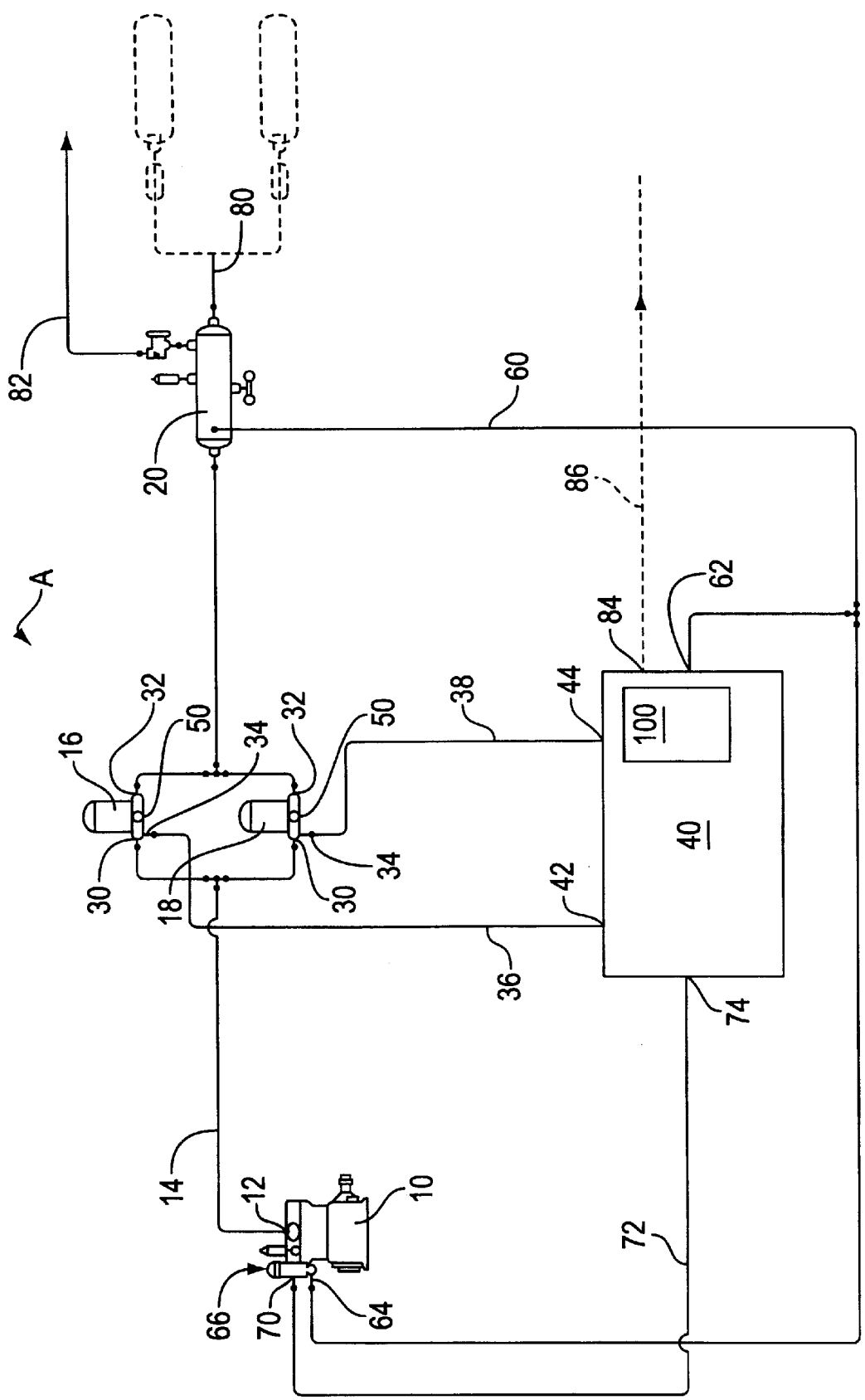
FIG. 1 is a schematic illustration of a compressed air system in accordance with the teachings of the present invention.

Referring now to the drawings wherein the showings illustrate the preferred embodiment and process of the invention only, and are not intended to limit the invention, the FIGURES show a continuous flow twin air dryer system A. The system includes an air compressor 10 which is typically powered by the engine of the automotive vehicle with which the system is associated. A reciprocating-type compressor having a rotating crankshaft is oftentimes used, although any conventional compressor can be incorporated into the system without departing from the scope and intent of the present invention.

The compressor delivers pressurized air through port 12 to supply line 14. Disposed in the supply line are first and second air dryers 16, 18. As illustrated, the air dryers are disposed in parallel relation so that flow through the supply line 14 can pass through either one or both of the air dryers on its path toward storage reservoir 20. Since the structure and operation of each air dryer is substantially identical, like numerals will refer to like components of the air dryers for purposes of consistency and brevity. Each air dryer includes a supply port 30. Thus, the pressurized air from the supply line is provided to the base of a conventional air dryer where it passes through a desiccant bed. Moisture is removed from the air by passing through the dessicant material before exiting the air dryer at delivery port 32.

In addition, each air dryer includes a control port 34 that communicates through line 36 (associated with the first air dryer) and line 38 (associated with the second air dryer). The other ends of the control lines 36, 38 are connected to controller or control module 40, particularly at ports 42, 44 thereof. As is known in the art, a control signal is provided by the module to initiate a purging or regeneration cycle. Generally, when a signal is transmitted to the control port of an air dryer, the supply port 30 is closed and a passage opened to an exhaust port 50. Thus, compressed air stored in the desiccant bed of the air dryer is exhausted to atmosphere through the exhaust port, thereby purging the desiccant bed and recharging it for the next drying cycle. As noted above, the air dryers work in parallel relation so that one air dryer is used for the drying cycle while the other air dryer is being purged. Periodic switching of the operation of the air dryers is effected by the control module to initiate the alternating purge and drying cycles.

In addition, the storage reservoir is in communication with the control module via line 60. Thus, the control module monitors the pressure in the storage reservoir. Likewise, the line 60 connects with port 64 associated with a governor 66 for the compressor. When the supply reservoir attains a predetermined pressure, the governor generates a signal to disable the compressor. In addition, the governor is in communication with the control module via port 70, line 72, and port 74 of the control module.

As will also be appreciated, the storage reservoir 20 is in communication with line 80 associated with braking for the vehicle. Further details of the air braking system are conventional and not particularly pertinent to the present arrangement so that further discussion herein is deemed unnecessary. Line 82 leading from the storage reservoir 20 represents the high air use mode, for example, air-assisted bulk off-loading, tire inflation, etc.

Generally, the arrangement and operation of a continuous flow twin air dryer system described to this point is conventional in the art but included for ease of understanding the invention. A similar compressed air system with twin air dryers is shown and described in commonly-assigned U.S. Pat. No. 5,209,764, the details of which are incorporated herein by reference.

With continued reference to FIG. 1, and additional reference to FIGS. 2 and 3, details of the twin air dryer and controller module are illustrated. The controller module shown in FIG. 3 includes the port 62 associated with the air line 60 from the storage reservoir. The port is preferably disposed on one face of the module along with the port 74 associated with air line 72 communicating with the governor. The control port 42 associated with the first dryer is shown on one side of the module housing and the control port 44 (not shown) associated with the other air dryer is disposed on the opposite face. In addition, an electrical power input 84 is shown on the front face, which is also represented by the dashed line 86 in FIG. 1, to provide power to the module. Of course, the particular position and location of the ports can be altered to meet the particular needs of the system.

Although not illustrated, the control module houses a pair of pressure switches in a solenoid pack within the housing. The three way solenoids are provided in a common package and connect electrically to the electronics module via a three-pin connector 90. The module also preferably can operate regardless of the polarity of the terminals. This arrangement allows the module to be used as a stand-alone device or mounted to the dryer body illustrated in FIG. 2. The software or control logic and the pressure switches control switching between the air dryers. This allows one dryer to regenerate while the other air dryer supplies clean, dry air to the system. Again, particular details of the solenoid valve assembly are not necessary to a full and complete understanding of the present invention so that further discussion herein is deemed unnecessary.

In accordance with the present invention, the controller module includes the memory 100 in its circuitry that monitors, for example, reservoir pressure, the governor associated with the compressor, and the operation of the twin air dryers. The memory identifies which dryer was most recently used for drying. In this manner, if the cycle is interrupted, the system preferably regenerates the air dryer most recently used for drying in the previous cycle. This ensures that the most recently regenerated dryer is used for drying incoming air, regardless of the drying mode. In addition, this minimizes the risk of dryer saturation and loss of function. The dryers are thus more evenly used under this protocol so that scheduled maintenance requirements for the desiccant cartridges are conveniently performed at the same time.

This is to be contrasted to prior, known arrangements which had no memory function. Either a random switching, or one which defaulted to re-start using the same air dryer for charging the reservoir as was in use when the drying cycle was interrupted, were available. These arrangements resulted in the same air dryer being repetitively used while the second air dryer was only used on occasion. Substantial differences in the use of the air dryer cartridges resulted with the prior arrangements so that when scheduled maintenance was undertaken, the desiccant cartridges had not been equally used. For example, the random start-up arrangements allowed a fifty percent (50%) probability that the previously used and saturated cartridge would be the air dryer used for the next charge cycle. As indicated above, this is undesirable since the potential for moisture or wet air to enter the compressed air system increases.

Figure 4:
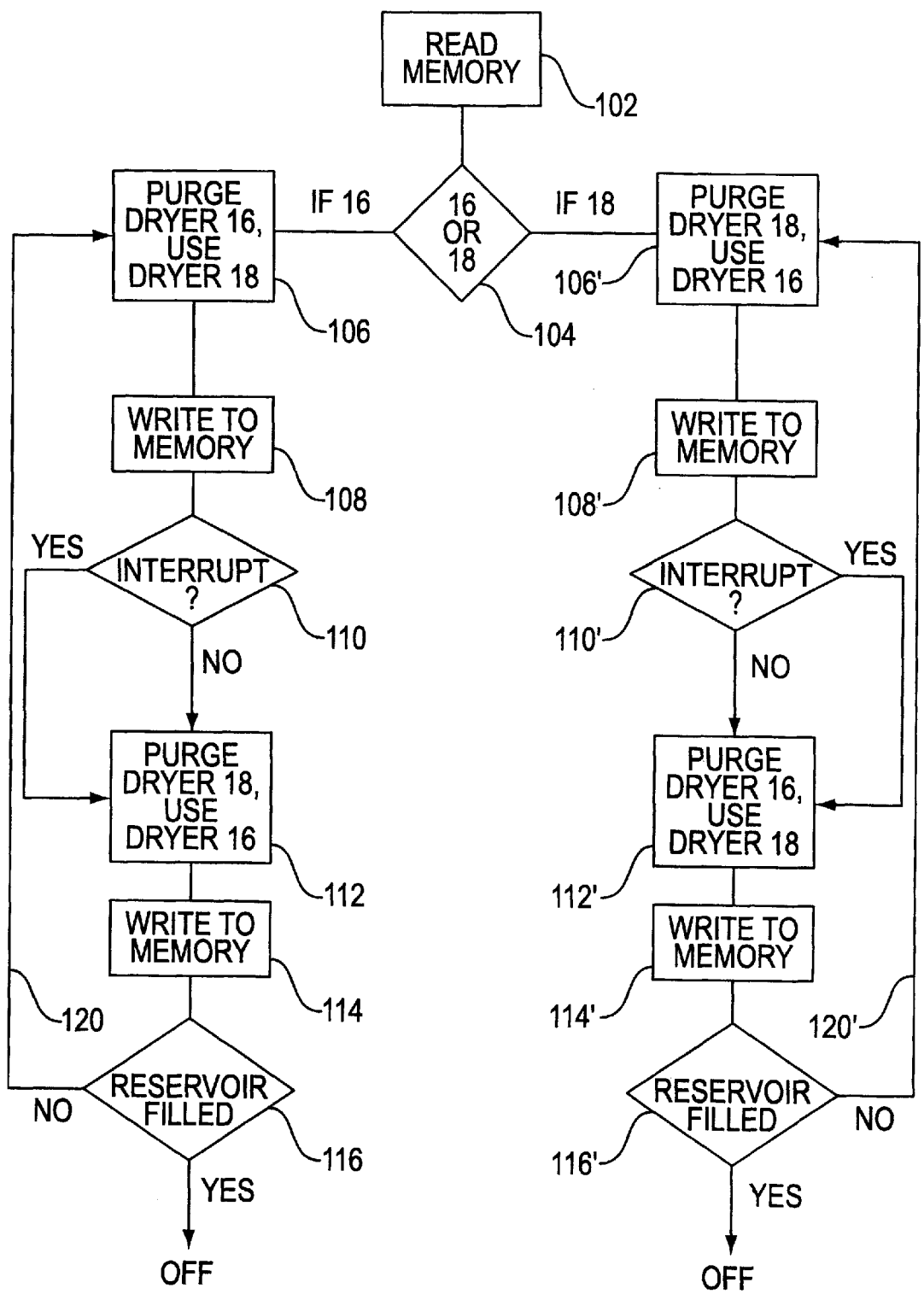
FIG. 4 is a simplified flow chart of the preferred controller process.

The memory and function of the memory in the present invention are exhibited in FIG. 4. The memory 100 is associated with the control module 40 and the representative flow chart exhibits its use in solving the noted problems. Specifically, the module determines which air dryer was last used to supply dry air to the storage reservoir. Thus, the memory is read in step 102, and a decision made in step 104 to determine which cartridge is used for drying purposes and which cartridge is purged. The right-hand and left-hand branches of the flow chart are symmetrical in operation so that like numerals refer to like steps in the control process. Upon beginning the respective purge or dry cycle 106, 106', the software then writes to memory at step 108, 108' to store the information of which cartridge is being used for drying. At decision tree 110, and in the absence of any interrupt, the cycle is completed. Once it is complete, the air dryers are switched at step 112, 112'. Again, the memory is overwritten in step 114, 114' and a decision made at step 116, 116' whether the predetermined pressure has been reached in the storage reservoir 20. If the reservoir pressure has not reached the threshold, the cycling continues as represented by return loop 120, 120'. If the pressure has been reached, the compressor is turned off and the cycles are complete.

If an interruption occurs during the cycling, then an interrogation of the memory determines which air dryer was last used for the dry cycle, and instructs the module to switch the air dryers. Thus, the air dryer last used for drying in the previous cycle is now regenerated.

The invention has been described with reference to the preferred embodiment and method. Obviously, modifications and alterations will occur to others upon a reading and understanding of this specification. It is intended to include all such modifications and alterations insofar as they come within the scope of the appended claims or the equivalents thereof.

Having thus described the invention, we claim:

1. In a compressed air system having first and second air dryers, a storage reservoir, and a control process for assuring adequate drying performance for vehicle air needs comprising the steps of:
    periodically purging the first and second air dryers through which pressurized air is alternately supplied to the reservoir;
    identifying a last used of the first and second air dryers; and,
    regenerating the last used dryer prior to regenerating a remaning of the first and second air dryers to ensure that the most recently regenerated dryer is used for drying incoming air.

2. The process of claim 1 comprising the further step of supplying air to the reservoir if pressure falls below a predetermined level.

3. The process of claim 1 wherein the system includes a compressor for charging the reservoir and the control process includes the further step of monitoring the charging step and terminating the charging if the reservoir reaches a predetermined pressure level.

4. The process of claim 1 comprising the further step of storing information relating to use of the first and second air dryers in a memory.

5. The process of claim 4 comprising the further step of reading the memory after an interruption of air supplied to the reservoir.

6. The process of claim 5 comprising the further step of monitoring reservoir pressure so that sufficient air is available to meet vehicle demands.

7. A compressed air system comprising:
    an air compressor;
    a reservoir for storing air supplied by the compressor;
    first and second air dryers interposed in parallel relation between the compressor and the reservoir for drying the compressed air prior to storage in the reservoir; and
    a controller for selectively initiating and alternating air drying and purging of the first and second air dryers, the controller including a memory for storing information regarding which of the first and second air dryers was last used for drying the compressed air.

8. The system of claim 7 wherein the controller includes means for initiating a purge of the last used of the first and second air dryers.

9. The system of claim 7 wherein the controller includes means for alternately purging and drying one of the first and second air dryers, and drying and purging the other of the first and second air dryers, respectively.

10. The system of claim 7 wherein the controller further comprises a means for monitoring the pressure in the reservoir.

11. The system of claim 10 further comprising means for disabling the compressor in response to the reservoir reaching a predetermined pressure threshold.

* * * * *

UNITED STATES PATENT AND TRADEMARK OFFICE
CERTIFICATE OF CORRECTION

PATENT NO. : 6,125,553
DATED : October 3, 2000
INVENTOR(S) : Quinn et al.

It is certified that error appears in the above-identified patent and that said Letters Patent is hereby corrected as shown below:

<u>Title page,</u>
Under Item [73], Assignee, please delete "AlliedSignal Truth Brake Systems Company" and insert -- AlliedSignal Truck Brake Systems Company --.

Signed and Sealed this

Fourth Day of June, 2002

*Attest:*

*Attesting Officer*

JAMES E. ROGAN
*Director of the United States Patent and Trademark Office*